May 30, 1933.  C. M. BAILEY  1,911,785

VALVE

Filed Jan. 19, 1931  2 Sheets-Sheet 1

INVENTOR:
CHARLES M. BAILEY.
BY
ATTORNEY.

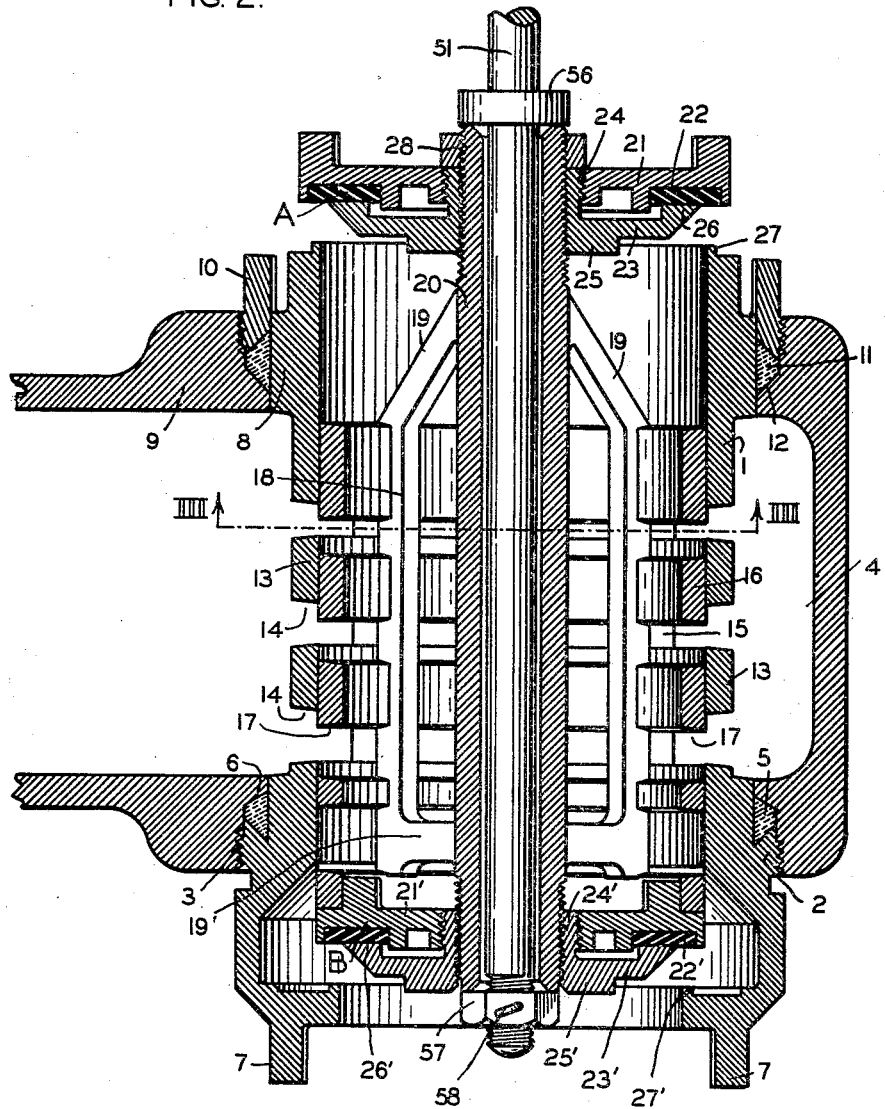

Patented May 30, 1933

1,911,785

UNITED STATES PATENT OFFICE

CHARLES M. BAILEY, OF BERKELEY, CALIFORNIA

VALVE

Application filed January 19, 1931. Serial No. 509,638.

This invention relates to improvements in valves, and more particularly to automatic fuel gas valves.

Among the objects of the invention is to accomplish the maximum opening of the valve with the minimum of movement.

Another object is to provide an auxiliary pressure-tight seating for the valve to insure against incidental seepage of the fuel when the valve is completely closed.

A further object is to provide a valve of large capacity especially adapted to regulation by automatic pressure or thermostatic control.

Other objects and advantages appear as the description progresses.

In this specification and the accompanying drawings, the invention is disclosed in its preferred form. But it is to be understood that it is not limited to this form, because it may be embodied in other forms. It is also to be understood that in and by the claims following the description, it is desired to cover the invention in whatsoever form it may be embodied.

In the two sheets of drawings:

Fig. 2 is an enlarged detail in vertical section of the cage and seating valves of the same.

Figure 1:
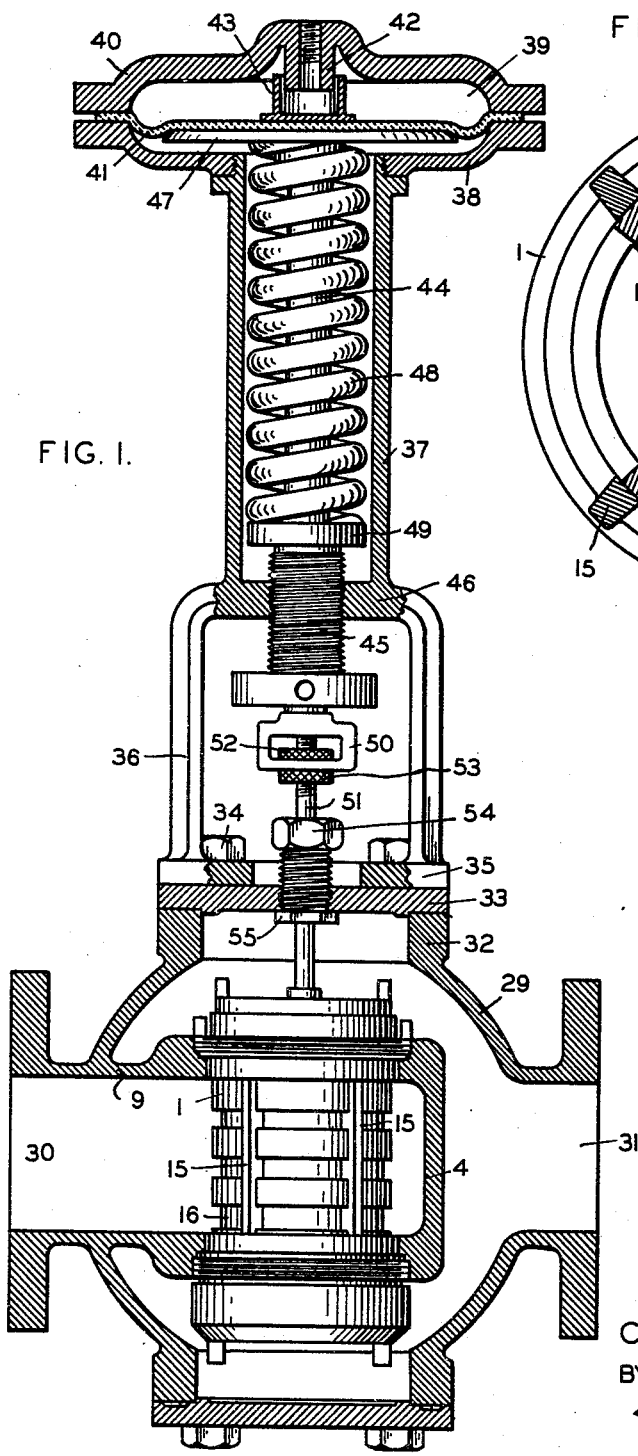
Fig. 1 is a vertical section of a pressure regulated valve constructed in accordance with this invention.
Figure 3:
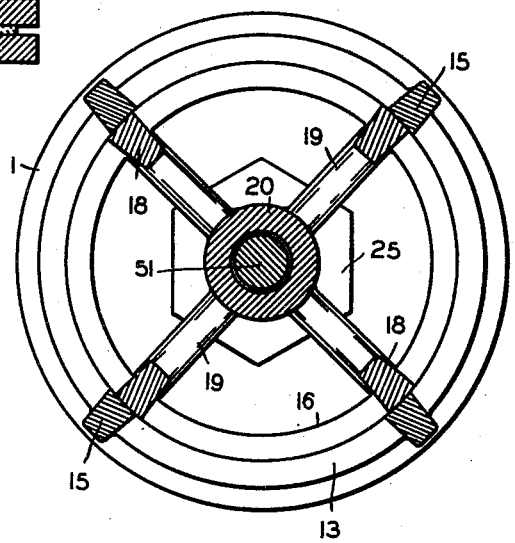
Fig. 3 is a horizontal section taken on the line III—III in Fig. 2, showing the telescoping sleeves of the cage valve.

In detail the construction illustrated in the drawings, referring to Fig. 2, comprises the annular outer sleeve 1, having the flange 2 externally threaded at 3 to engage the threaded opening in the bottom of the internal chamber 4.

The top of this flange is cut to form a bevel to compress the packing 5 against the inclined annular shoulder 6. The lower end of the sleeve has the lugs 7—7 integral therewith and adapted to be engaged by a suitable spanner for turning the sleeve.

The upper end 8 of the sleeve extends through the top 9 of the chamber 4. The castelated gland 10 is screwed into the top of the chamber 4 to compress the packing 11 against the annular shoulder 12. The sleeve 1 is thus sealed pressure-tight within the chamber 4 by the packings 5—11.

The sleeve is divided into a series of rings 13—13 with the ports 14—14 therebetween. These ports are of progressively increasing width from top to bottom, as shown in Figs. 1-2. The integral shrouds 15—15 maintain the rings 13 in fixed relation.

The inner sleeve 16 has the annular ports 17—17 adapted to register with the ports 14—14. The ports 17 are likewise of progressively increasing width to match the ports 14 of the outer sleeve 1. The integrity of the inner sleeve is maintained by the shrouds 18—18. The inner sleeve is a close running fit within the outer sleeve 1.

The shrouds 18—18 have their upper ends 19—19 inclined inwardly. These ends are integral with the central tube 20 extending through the interior of the sleeve 16. The lower end of the tube 20 is supported by the spider 19' integral with the shrouds 18—18.

The open ends of the cage valve are adapted to be closed by the stop valves A—B. These valves comprise the disk heads 21—21' which have annular slots cut in the lower sides thereof to receive the washers 22—22'. These washers may be of any suitable material but rubber is preferred.

The annular valve seats 27—27' are formed on each end of the sleeve 1 opposite the washers 22—22'.

The disks 23—23' have the externally threaded hollow bosses 24—24' which engage the threaded central opening in the heads 21—21'. The hexagons 25—25' facilitates the screwing of the disks 23—23' into the heads 21. The annular flanges 26—26' on the disks 23—23' retain the washers 22—22' in position.

The disks 23—23' are centrally bored and tapped to engage the threaded ends of the tube 20. The heads 21—21' are castelated to facilitate the adjustment of the valves A—B on the tube 20. When adjusted, the valve B jams against the lower end of the sleeve 16. The valve A is then so adjusted on the tube 20 as to seat synchronously with the valve B. The jam nut 28 locks the valve A in adjusted position.

The walls of the chamber 4 are integral with the enclosing globular fitting 29 having the flanged inlet and outlet openings 30—31 respectively, see Fig. 1. The nature of the fitting may be varied to meet conditions. The neck 32 is closed by the cover 33, held by the cap screws 34, extending through the flange 35 of the yoke 36, and engaging the neck 32. The upper end of the yoke is integral with the tubular extension 37.

This extension is screwed into the lower flanged plate 38 of the diaphragm chamber 39. The upper plate 40 is flanged and is screwed to the lower plate to complete the chamber 39. The flexible diaphragm 41 has its margins confined between the abutting flanges of the upper and lower plates.

The upper plate 40 is provided with the hollow boss 42 telescoping within the annular cup 43 resting upon the diaphragm. This protects the diaphragm from injury by either the hub 42 or the under side of the plate 40. The cup 43 also serves as a stop, limiting the upward movement of the diaphragm, by contacting the plate 40.

The shaft 44 is guided in the adjustable nut 45 screwed into the bottom 46 of the tube 37. The disk 47 is attached to the upper end of the shaft 44. The spring 48 works within the tube 37 and expands between the disks 47 and the collar 49 encircling the shaft 44 and resting on the nut 45. The tension of the spring is regulated, by turning the adjustable nut 45, with respect to the counterbalancing fluid pressure on top of the diaphragm 41.

The lower end of the shaft 44 has the loop 50 fixed thereon to receive the valve stem 51, the end of which telescopes within the end of the shaft 44. This stem may be adjusted by the running nut 52 within the loop, in cooperation with the lock nut 53. This stem is vertically aligned by the guide 54, threaded into the cover 33 and having an internal packing gland.

The lower end of the valve stem 51 extends through the tube 20 of the cage valve. The stem is a loose fit within the tube to allow for minor inaccuracies of the alignment of the stem. The collar 56 encircles the stem 51 and abuts the upper end of the tube 20. The nut 57 having the cotter pin 58, at the lower end of the stem, holds the stem in fixed position with respect to the tube 20. Thus assembled, the inner sleeve 16 rises and falls with the rise and fall of the diaphragm 41.

The present design of the invention is particularly adapted to gas fuel control valves for steam generating boilers. The fuel enters at 30, into the chamber 4, surrounding the sleeve 1. When the valve is open, the gas passes through the aligned ports 14—17 and escapes through the unseated valves A—B at the top and bottom respectively into the fitting 29 and from the outlet 31.

The steam pressure is piped to the pressure chamber 39, through the threaded spud 42 above the diaphragm. As the pressure increases it forces the diaphragm 41 downward against the tension of the spring 48, lowering the sleeve 16, and closing the ports 11—14, reducing the amount of fuel entering at 30 and flowing through the valve and out at 31. Contrawise, a drop in pressure in the chamber 30, opens the ports 14—17, admitting more fuel to the furnace beneath the boiler, not shown, to increase the generation of pressure.

When the cage valve is entirely closed, the washers 22—22′ of the stop valves A—B seat on the annular flanges 27—27′, closing the ends of the sleeve 1. When the cage valve is closed, a small amount of gas seeps between the outer and inner sleeves, into the interior of the valve. Further escape, however, is impossible due to the seating of the stop valves A—B.

This effects the extinguishing of the furnace after a predetermined steam pressure is attained. When the pressure decreases, the valve opens and the furnace is relighted by a suitable pilot light (not shown).

The progressively increasing width of the ports 14—17 from top to bottom, causes the ports to open and close seriatim beginning with the lowest port. Thus, as the valve opens an increasing number of ports are brought into play as the movement progresses. This accomplishes an extreme sensitivity of the valve to slight adjustments.

By a simple adjustment of the valve stem 51, by means of the nuts 52—53, an exact equilibrium can be automatically maintained between the amount of fuel and the desired pressure. Obviously, a conventional thermostatic control unit could be substituted for the pressure regulating means shown, for operating the valve, without departing from the spirit of this invention.

Having thus described this invention, what I claim and desire to secure by Letters Patent is:

1. A valve including a chamber; a pair of telescoping sleeves in said chamber and having ports therethrough; stop valves attached to the opposite ends of one of said sleeves and adapted to close both ends of both sleeves when said ports are closed, and means for moving said sleeves relatively to each other.

2. A valve including a chamber; a pair of telescoping sleeves in said chamber and having ports therethrough, one of said sleeves being fixed in said chamber and having valve seats in its opposite ends; means for moving one of said sleeves relatively to the other; stop valves on the opposite ends of said movable sleeve cooperating with said seats.

3. A valve including an enclosing fitting having an internal chamber; a pair of telescoping sleeves in said chamber and having ports therethrough; one of said sleeves being fixed in said chamber and having valve seats in its ends within said fitting; stop valves on the opposite ends of said movable sleeve cooperating with said seats; and operating means on said fitting engaging said movable sleeve.

4. A valve including an enclosing fitting having an internal chamber; an outer sleeve having its ends sealed in the walls of said chamber; an inner sleeve slidable in said outer sleeve, both of said sleeves having superimposed lateral ports adapted to register with each other; valve seats at each end of said outer sleeve; stop valves threaded on said inner sleeve on opposite ends and cooperating with said valve seats, and operating means engaging said inner sleeve.

5. A valve including an enclosing fitting having an internal chamber; an outer sleeve open at each end and having its ends sealed in the walls of said chamber; an inner sleeve slidable in said outer sleeve and open at both ends; both of said sleeves having superimposed lateral ports therein adapted to register with each other; valve seats at each end of said outer sleeve; a tube extending through said inner sleeve and fixed thereto; stop valves adjustably threaded on opposite ends of said tube and cooperating with said valve seats; and an operating stem engaging said tube.

6. A valve including an enclosing fitting having an internal chamber; an outer sleeve fixed in said chamber; an inner sleeve slidable in said outer sleeve, both of said sleeves having a series of ports therein of progressively varying capacity, valve seats at each end of one of said sleeves; a pair of stop valves fixed to the ends of the other sleeve and cooperating with said valve seats, and means operating said inner sleeve.

In testimony whereof I have hereunto set my hand this 13th day of January, 1931.

CHARLES M. BAILEY.